United States Patent

Schisselbauer

[15] 3,660,698

[45] May 2, 1972

[54] PHOTO-SCR CARD READER CIRCUITS

[72] Inventor: John C. Schisselbauer, Southampton, Pa.

[73] Assignee: Peripheral Dynamics, Inc., Norristown, Pa.

[22] Filed: Feb. 3, 1970

[21] Appl. No.: 8,287

[52] U.S. Cl. ........................307/311, 235/61.11 E, 307/218, 307/238, 307/252 J, 307/305

[51] Int. Cl. ...................G06k 7/10, H03k 3/42, H03k 19/14

[58] Field of Search ............235/61.115, 61.603; 250/219 Q, 250/211 J; 307/311, 252 J, 305, 238, 218

[56] References Cited

UNITED STATES PATENTS

| | | | |
|---|---|---|---|
| 2,877,359 | 3/1959 | Ross | 307/305 |
| 3,201,764 | 8/1965 | Parker | 307/311 |
| 3,284,929 | 11/1966 | Azure | 235/61.603 |
| 3,290,551 | 12/1966 | Cake | 307/305 |
| 3,375,502 | 3/1968 | Shively | 307/238 |
| 3,390,273 | 6/1968 | Weckler | 250/211 J |
| 3,496,342 | 2/1970 | Milford | 250/219 Q |
| 3,524,986 | 8/1970 | Harnden | 250/211 J |

OTHER PUBLICATIONS

GE, " Controlled Rectifier Manual," 1962, pp. 70 & 71. TK2798G4g6.2

*Primary Examiner*—Maynard R. Wilbur
*Assistant Examiner*—Thomas J. Sloyan
*Attorney*—Paul & Paul

[57] ABSTRACT

In a card reader compatible with electronic data processing equipment, electronic sensing circuits are disclosed which utilize photo-silicon controlled rectifiers in cooperation with logic circuitry. A photo-SCR rear sensor having binary memory is provided comprising a photo-SCR in series with one branch of a logic gate, with another branch connected to a reset pulse generator. An automatic reset sensor comprises a photo-SCR with its cathode in series with the base of a transistor, the anode of the photo-SCR being in series with a first branch of a logic gate and the collector of the transistor being in series with a second gate.

1 Claim, 2 Drawing Figures

INVENTOR.
John C. Schisselbauer
BY
Paul & Paul
ATTORNEYS.

PHOTO-SCR CARD READER CIRCUITS

DESCRIPTION OF THE PRIOR ART

A. Field of the Invention

This invention relates to solid state photo sensitive sensors for use in electronic data processing apparatus, and, more particularly to photo sensors utilizing a photo-SCR in combination with a logic gate.

B. Description of the Prior Art

Electronic circuitry utilized in card readers and other electronic data processing apparatus has employed photo sensitive components for detection of information. Photo transistors and photo diodes have been commonly used, both these components having the property of switching from a high impedance state to a low impedance with the application of a threshold light intensity. Thus, by placing an array of such components in close registry with a passing punched card, or punched paper tape, the presence of a punched hole permits passage of a short pulse of light causing a change in the impedance state of the device, which change can be detected by associated detection circuitry. However, a major drawback of such devices exists in the fact that they have no memory, inasmuch as the device immediately switches back to its normal impedance level when the light source is removed. For this reason, it is necessary to have memory capacity, usually in the form of a binary register, for use in cooperation with the array of photo-components. Further, a relatively great light intensity has been required to switch these devices, making them sensitive to light source variations.

The photo-silicon controlled rectifier (photo-SCR) is a bistable photo-switching device having characteristics independent of the light input at all light intensities above its triggering level. In the absence of incident light, the photo-SCR has a high impedance, of approximately 10 megohms, under which circumstances it is considered to be in the "off" state. In the presence of incident light, the photo-SCR switches to a low impedance, or "on" state, having an impedance of under 10 ohms. The device will then remain in the "on" state indefinitely, until it is turned off by reducing the current through the device below the holding current required to maintain it on. The device thus has binary memory, in that once light has triggered the device on, it will remain on indefinitely until its anode current is reduced to below the holding current. Thus, if a light pulse is delivered to the photo-SCR, it will sense and remember the existence of the pulse, and will hold its memory until reset to the off state.

The above memory property of the photo-SCR provides obvious advantages over the prior art, in that it can obviate a binary register for use with the photo sensors. However, the difficulty of turning the photo-SCR off, once it has been turned on, has required extensive circuitry often resulting in inefficient and cumbersome design. It has generally been found necessary to provide independent means for switching the power source off in order to reset the photo-SCR to an off condition. The requirements of an independent power supply and additional reset circuitry have thus far limited the use of photo-SCR's in electronic data processing equipment.

SUMMARY OF THE INVENTION

It is an object of this invention to provide a read sensing circuit having memory capacity.

It is another object of this invention to provide a sensing circuit which utilizes a photo-SCR, which circuit turns itself off when incident light is removed.

It is a further object of this invention to provide a photo sensing circuit which is activated by light but which is independent of light intensity in its on state.

It is a further object of this invention to provide a photo sensing circuit which can be utilized for punched card reading and which utilizes part of a standard integrated circuit in conjunction with a photo-SCR to obviate the need for any other reset means.

Accordingly, a sensing circuit for sensing light impulses generated by data processing equipment comprises a photo-SCR connected between a first input terminal of a logic gate, a second input terminal of the gate being connected to a reset generator, such that a pulse of light incident upon the photo-SCR drives the logic gate output into a first state, and a reset pulse from said reset generator turns off the photo-SCR and returns the logic gate to a second state after termination of the reset pulse. In another embodiment, a photo-SCR is connected in series with a first input terminal of a logic gate, a transistor is connected in series with a second input terminal of a logic gate, and the cathode of said photo-SCR is connected to the base of said transistor so as to shunt current from the photo-SCR, causing it to turn off in the absence of light.

DESCRIPTION OF THE PREFERRED EMBODIMENTS

Figure 1:
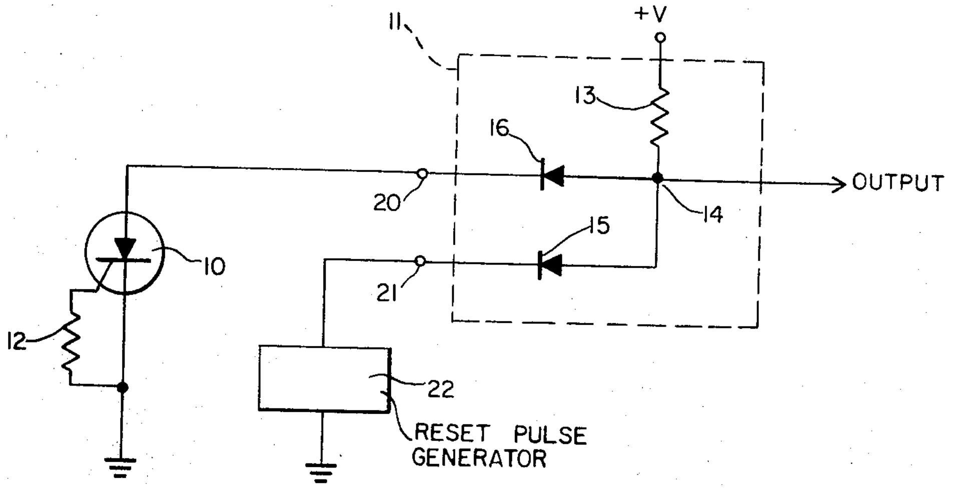
FIG. 1 is a schematic diagram of a read station sensor and FIG. 2 is a schematic diagram of a leading edge sensor.

Referring now to FIG. 1, photo-SCR 10 comprises three terminals, as does a conventional SCR, namely an anode, cathode and gate. The properties of a photo-SCR are described in detail in "Applications and Circuit Design Notes," Bulletin D430–01, 3–62, Solid State Products, Inc. The photo-SCR 10 is connected to a conventional logic gate 11 at one of its input terminals, shown in FIG. 1 as terminal 20. The logic gate may be of any conventional form, and is preferably part of an integrated circuit package or chip. A resistor 12 is connected between the gate terminal and the cathode for bias purposes. The cathode is shown as being tied to ground, ground being understood to be the negative terminal of the voltage supply powering the logic gate. For purposes of illustration, the logic gate is shown schematically as a two terminal OR gate having a load resistor 13, a logic node 14, and two diodes 15 and 16 connected to logic node 14. The power supply is indicated as +V. It is understood that there are many conventional forms of logic circuitry, and any equivalent for the simple two diode OR circuit could be used. Logic gate input terminal 21 is connected to a conventional pulse generator 22 which provides reset pulses.

In operation, the photo-SCR 10 is mounted at the reading station of a card reader or other reading device, in registry with a light source, with the data-containing card or tape being passed between the light source and the light sensor. Corresponding to the presence of a punched hole in the card or tape, a pulse of light will be incident upon photo-SCR 10, causing it to go into an "on" state, providing a closed path to ground. At the termination of the pulse of light caused by the hole, photo-SCR 10 will remain on, with current flowing from the voltage source through resistor 13 and diode 16. Prior to the reading of the next column of the card or tape, a reset ground pulse is applied to input 21, for the duration of which node 14 is effectively tied to ground through diode 15. As the forward voltage across photo-SCR 10 is about 0.6 to 0.7 volt, current flow will be shunted through diode 15, thus switching photo-SCR 10 to its off state. At the termination of the reset pulse, the photo-SCR 10 remains in an off condition, ready to sense the next pulse of light.

It is to be noted that the state of photo-SCR 10, indicating the presence or absence of a pulse of light, can be interrogated at any time prior to the reading of the next column from the punched card or tape. Generally a plurality of such photo-SCR's in an array will be used, corresponding to the hole positions in a card column. Since the photo-SCR's retain memory, they can be interrogated prior to the reading of the next column. Thus, it is unnecessary to store the information in a separate buffer register, which register in turn would be read out prior to the reading of the next column.

In addition to the above noted advantage, it is seen that only the SCR, and the bias resistor between gate and cathode, need be placed physically at the point of reading. The power supply, the logic gate, and the pulse generator can all be placed remotely, thus affecting a savings in wiring and space requirements.

Figure 2:
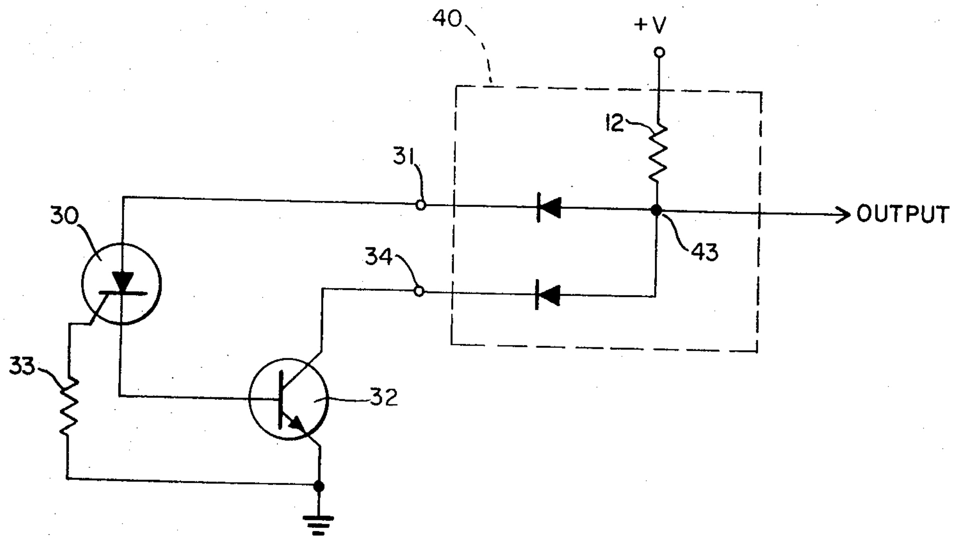

Referring now to FIG. 2, there is shown a schematic diagram of a leading edge sensor circuit, for detecting when the leading edge of a punched card passes by a control point. The photo-SCR 30 is placed in registry with a light source at the point where it is desired to detect the passage of the leading edge of the card.

Photo-SCR 30 has its anode connected to a first input terminal 31 of logic gate 40, and its cathode connected to the base of transistor 32. The gate of photo-SCR 30 is connected through bias resistor 33 to ground, and the emitter of transistor 32 is also connected to ground. The collector of transistor 32 is connected to input terminal 34 of logic gate 40.

In operation, light is normally incident upon photo-SCR 30, as there is no card or other opaque material between the light source and the photo-SCR. During this condition, photo-SCR 30 is maintained in an on condition, the current through its cathode passing into the base of the transistor, thus keeping the transistor turned on. However, the transistor when turned on also provides a path to ground from node 43, and diverts current from the photo-SCR. The more current diverted, the less into the base of transistor 32 and the less current passing through transistor 32. It is seen that a regenerative action is present, stabilizing into a condition determined by the forward biased voltages across the photo-SCR 30 and transistor 32 respectively.

Under the stabilized circuit condition, the amount of current flowing through the photo-SCR 30 is less than the normal holding current required to keep it conducting in the absence of light. ACcordingly, when a card passes through and blocks off the incident light, photo-SCR 30 turns off due to the insufficient holding current. This also cuts off current into the base of transistor 32, thereby turning it off, such that both gate inputs are opened. This causes a rise in voltage at node 43, which is detected, processed and transmitted to photo logic circuitry for control of the read out phase. When the card being read has passed through, incident light again falls upon the photo-SCR 30, turning it on and priming the sensor circuit for the next leading edge.

The primary advantage of the leading edge sensor over other circuits using available photo diodes and photo transistors is that it takes advantage of the improved sensitivity of the photo-SCR. The incident light required to activate the photo-SCR is considerably less than that required for the other devices. The available power supply is another design consideration. In the circuits of this invention, the power supply voltage is on the order of 5 volts. Most other available photo devices require on the order of 25 volts for operation.

From the above, it is seen that a key element of each of the circuits of this invention is the utilization of a photo-SCR in cooperation with conventional logic circuitry. It is to be noted that the logic circuitry shown represents an illustrative form only. In practice, the logic circuitry may be part of an integrated circuit containing substantially more functional capacity than the simple two-diode gate illustrated.

What is claimed is:

1. Electronic apparatus for providing a binary electrical output corresponding to the presence or absence of incident light, comprising:

a. a binary memory light sensing device for sensing the presence or absence of incident light, having a high impedance state when no light is incident upon it, and switchable to a low impedance state when light is incident upon it, said low impedance state being maintained in the absence of incident light when current through said device is maintained above a predetermined level;

b. semiconductor switching means having its input terminal connected in series with said sensing device;

c. logic gate means connected to said light sensing device and said semiconductor switching means for deriving an electrical output in accordance with the impedance state of said light sensing device;

d. said semiconductor switching means shunting said sensing device so that the current flow through said sensing device is limited to a level below said predetermined level when light is incident upon said sensing device;

e. power supply means providing power to said logic gate means; and, f. said semiconductor switching means further comprising a transistor, and said light sensing device comprises a photo-SCR having an anode, cathode and gate, said cathode being connected to the base of said transistor, and said gate being resistively coupled to the emitter of said transistor, said photo-SCR having a holding current which must be maintained to keep said photo-SCR in a low impedance state in the absence of incident light, said transistor cooperating with said logic gate means to provide a low impedance shunt across said photo-SCR so as to maintain the current through said photo-SCR at a level below said holding current when light is incident upon said photo-SCR, and to turn off said photo-SCR when no light is incident upon it.

* * * * *

UNITED STATES PATENT OFFICE
CERTIFICATE OF CORRECTION

Patent No. 3,660,698 Dated May 2, 1972

Inventor(s) John C. Schisselbauer

It is certified that error appears in the above-identified patent and that said Letters Patent are hereby corrected as shown below:

In the Abstract, Line 4, "rear" should be --read--.

Signed and sealed this 26th day of September 1972.

(SEAL)
Attest:

EDWARD M.FLETCHER,JR.
Attesting Officer

ROBERT GOTTSCHALK
Commissioner of Patents